UNITED STATES PATENT OFFICE.

JOHN WILSON, OF NEW YORK, N. Y.

METHOD OF PURIFYING WATER.

SPECIFICATION forming part of Letters Patent No. 619,918, dated February 21, 1899.

Application filed January 26, 1898. Serial No. 668,097. (No specimens.)

*To all whom it may concern:*

Be it known that I, JOHN WILSON, of New York, (Brooklyn,) county of Kings, and State of New York, have invented a certain new and useful Improvement in Methods of Purifying Water, of which the following is a specification.

The object of my improvement is to render water potable or to increase its potability, and also to purify it for other purposes—as, for instance, for laundry use or employment in steam-generators.

In carrying out my improvement I take water, whether under atmospheric pressure, pneumatic pressure, hydraulic pressure, or any other pressure, and add thereto an aqueous solution of sodic chlorid (NaCl) and sulfate of alumina. This I use in proportions suitable to the character of the water to be purified, and hence it is impossible to give definite proportions. For example, I would suggest that for water having twenty grains of impurities to the gallon I may successfully use five grains of sodic chlorid and ten grains of sulfate of alumina. After this treatment the water must be freed from impurities by settling, decantation, or filtration by means of any desirable apparatus.

Water containing impurities differing in amount from the example given may be treated by taking a portion of such water in a graduated test-tube, adding one grain each of sodic chlorid and sulfate of alumina, and if that amount be insufficient to precipitate adding another grain of each and proceeding in that manner until a precipitate is formed. Additions of sodic chlorid and sulfate of alumina will be made until precipitation shall have ceased. This process will be pursued with such rapidity that the results will not be dependent upon the settling of such impurities as may separate by gravitation. Thus I shall obtain the proper amount of sodic chlorid and sulfate of alumina for the impurities. Having thus determined the proportion necessary for the treatment of any water, I employ that proportion.

The method of treating the water is to add the sodic chlorid, which will principally unite with any argillaceous matter and form chlorid of alumina, which precipitates quickly. The sulfate of alumina, which is also a quick precipitant, acts to unite more particularly with the vegetable matter in the water, although it also acts to precipitate the argillaceous matter. The sodic chlorid and the sulfate of alumina produce a double decomposition—that is to say, some of the sulfuric acid in the sulfate of alumina goes over to the soda in the sodic chlorid, because it has for it a great affinity, and some of the chlorin from the sodic chlorid goes over to the alumina in the sulfate of alumina, it having a great affinity therefor. Each of the new compounds that is formed is a quick precipitate.

Wherever I use in my specification and claim the term "sulfate of alumina" it is to be understood as not meaning any of the alums.

The sodic chlorid and the sulfate of alumina may be introduced separately or together.

Any suitable apparatus may be used for carrying out my improvements.

What I claim as new, and desire to secure by Letters Patent, is—

The method of purifying water consisting in introducing into it sodic chlorid and sulfate of alumina in sufficient quantities to precipitate the impurities, and afterward separating the impurities from the water.

In testimony whereof I have signed my name to this specification in the presence of two subscribing witnesses.

JOHN WILSON.

Witnesses:
W. LAIRD GOLDSBOROUGH,
D. A. DAVIES.

UNITED STATES PATENT AND TRADEMARK OFFICE
CERTIFICATE OF CORRECTION

PATENT NO : 6,019,918
DATED : February 1, 2000
INVENTOR(S) : MILKO G. GUERGOV

It is certified that error appears in the above-identified patent and that said Letters Patent is hereby corrected as shown below:

Column 26, Line 10, Claim 9: delete "has" and insert "gas".

Column 26, Line 11, Claim 9: delete "tde" and insert "the".

Column 27, Line 20, Claim 16: delete "tie" and insert "the".

Signed and Sealed this

Thirteenth Day of March, 2001

Attest:

NICHOLAS P. GODICI

Attesting Officer

Acting Director of the United States Patent and Trademark Office